INVENTOR
Bernhard Kunst

BY Bailey, Stephens and Huettig
ATTORNEYS

INVENTOR
Bernhard Kunst

United States Patent Office 3,457,143
Patented July 22, 1969

3,457,143
METHOD FOR MULTIPLE EFFECT FLASH EVAPORATION AND CONTACT CONDENSATION
Bernhard Kunst, Gustavsburg, Germany, assignor, by mesne assignments, to GHH-M.A.N. Technik Gesellschaft fur Anlagenbau, m.b.H., Essen (Ruhr), Germany
Continuation of application Ser. No. 455,403, May 13, 1965. This application Feb. 27, 1968, Ser. No. 708,724
Claims priority, application Germany, May 15, 1964, M 61,017
Int. Cl. C02b 1/10; B01d 3/06, 3/02, 1/26
U.S. Cl. 203—11                                   1 Claim

ABSTRACT OF THE DISCLOSURE

This is a process for the concentration of a solution and the extraction of the solvent according to the flash evaporation method with direct contact condensation, in which the solution vapors produced in stages are condensed step by step in immediate contact with a solvent flowing in countercurrent. The solution flows through the stages which are located on ascending levels, each stage consisting of an evaporation and a condensing chamber arranged side by side; while the solution flow is directed from bottom to top, that of the solvent is from top to bottom. The solution stages are in communication with each other by means of submerged orifices interconnecting wells filled with the ascending solution. Similarly for the solvent stages in descending flow. The vertical step spacing is so arranged as to have the vapor pressure difference and dynamic losses of the flow compensated for by the static pressures of the liquid columns between the liquid levels of two superposed stages.

---

This application is a continuation of my application S.N. 455,403, filed May 13, 1965, now abandoned, for "Method for Multiple Effect Flash Evaporation and Contact Condensation."

This invention relates to the separation of concentrates from liquid solutions and, in particular, to a combined method utilizing both multiple effect flash evaporation and contact condensation.

Flash evaporators are used for concentrating liquid solutions and recovering valuable products therefrom as, for example, fresh water from sea water. In particular, they are used when the solution tends to deposit a heat insulating layer of scale on the heating surfaces. In conventional multiple effect flash evaporating processes combined with contact condensation, the solution to be vaporized is flashed in stages either by way of U tubes, throttle valves, or through turbines in order to use the available energy. The condensate traveling opposite to the flow of the solution must be pumped from stage to stage in order to be raised to the next higher pressure in each one.

This results in a considerable increase in the manufacturing cost per stage and the optimum number of stages needed for economical operation of the evaporator is not very large. In order to keep the plant costs reasonably low, it becomes necessary to accept a higher heat consumption per kilogram of vapor because a smaller number of stages would be thermodynamically less favorable. In addition, the energy expended to bring the solution to the pressure of the first stage is lost during the flashing process. Also, this energy cannot be recovered to transfer the condensate from stage to stage. Even if the pressure energy is used in the stages on the evaporator side by means of turbines and then supplied to the pumps on the condenser side, energy still has to be provided to bring the solution up to the required pressure of the first stage, quite apart from the energy losses to be covered for the turbines and condensate pumps. Because of the numerous rotating components for the system, the dependability of the evaporator is impaired because of the danger of leakages, corrosion, and the increases in scale deposits. The problems with respect to the controls for the numerous pressure reducing systems and pumps are also quite considerable.

The object of this invention is to improve upon the heretofore used methods by using a static liquid column as an equilibrium means for the vapor pressures in the individual evaporation and condensing processes.

In general, this invention consists of a method of multi-effect flash evaporation coupled with contact condensation with fluid flow therebetween provided by communications both at the evaporating and condensing sides, whereby the varying vapor pressures from the uppermost coldest stage to the lowermost hottest stage are taken up by the static liquid column pressure which increases in stage to stage from the top to the bottom. The raw feed liquid, usually a solution which has been heated to just below its boiling point, is fed to its lowest flashing stage chamber and the cold fluid, usually the condensate of the vapor produced, is fed into the uppermost condensing stage chamber. The vapor reaches the relevant chamber of the contact condenser by way of a common vapor space for the evaporation and condensing sides in each stage. This causes the solution to be simultaneously concentrated and cooled in the known manner while the condensate amount increases and is heated.

The means by which the objects of the invention are obtained are disclosed more fully with reference to the accompanying drawings in which.

Figure 1:
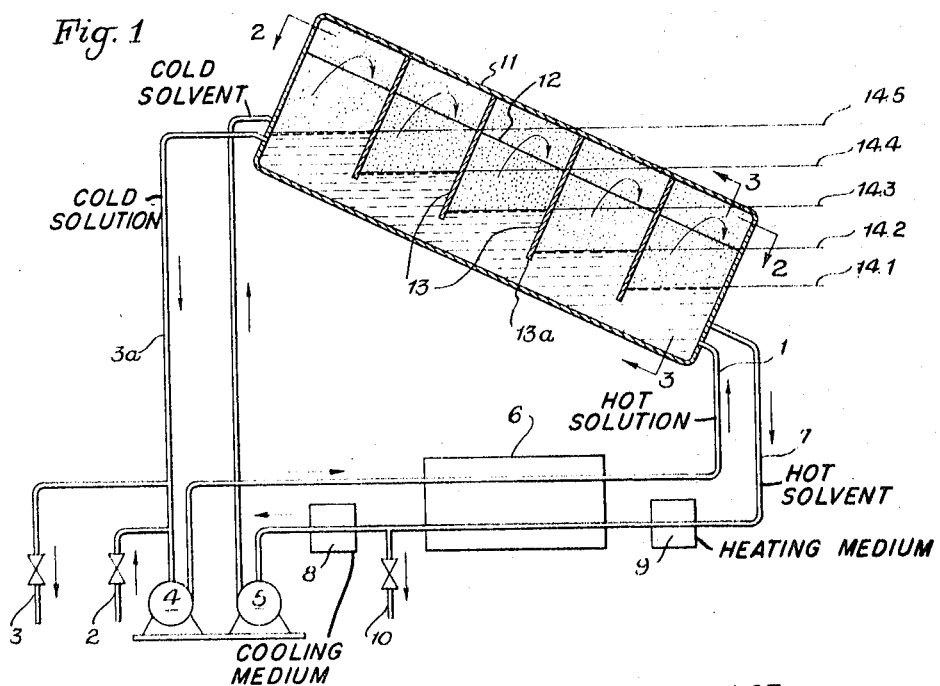
FIGURE 1 is a longitudinal cross-sectional view through a five-stage evaporator having closed evaporator and condenser circuits.
Figure 2:
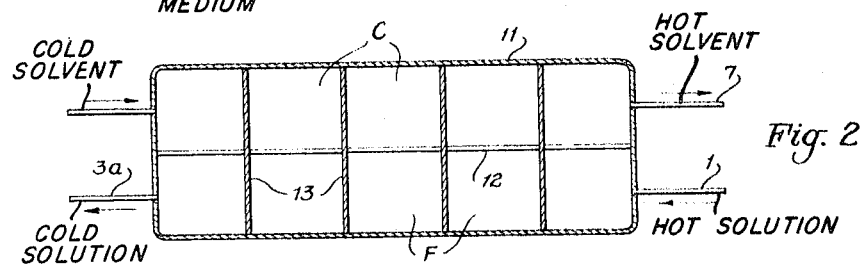
FIGURE 2 is a cross-sectional view taken on the line 2—2 of FIGURE 1.
Figure 3:
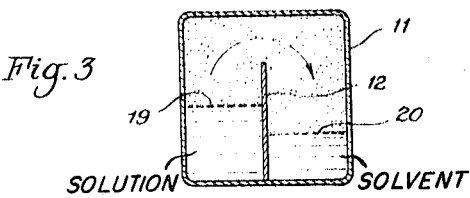
FIGURE 3 is a cross-sectional view taken on the line 3—3 of FIGURE 1.

As shown in FIGURES 1 to 3, the evaporator circuit pipe 1 is supplied with the raw feed liquid through pipe 2. The concentrate at its desired final concentration is taken off through pipe 3 by way of concentrate pipe 3a. Circulating pumps 4 and 5 are provided only to overcome the flow pressure losses in the circuits and therefore do not have to deliver against a static head because all the stage chambers in the evaporator are connected together as by communicating pipes. Heat exchanger 6 recovers heat from the condensate in pipe 7 leaving the lowermost stage for the purpose of warming the feed liquid in pipe 1 and a portion of the concentrate leaving the uppermost stage. In the heat exchangers 8 and 9, heat is supplied or extracted from the system to maintain the necessary temperature differences for the transport of the vapor. Heat exchanger 8 also replaces the heat loss due to the conductance and radiation to the atmosphere. The vapor produced in the evaporator is removed through pipe 10 in the form of cold condensate.

The evaporator is composed of a closed tank 11 of rectangular or circular cross-section within which is mounted a continuous longitudinally extending partition 12 and transverse baffles 13 which form chambers corresponding to the individual stages. Partition 12 separates tank 11 into a row of flash evaporating stage chambers F and a row of condensate stage chambers C. Each of these rows of stage chambers extends upwardly in a vertical direction. The continuous longitudinal partition 12 is spaced from the top of the tank in separating the solution from the condensate. Baffles 13 separate the vapor spaces of the individual stage chambers from each other.

In tank 11, the solution levels 14.1 to 14.5, inclusive, and the solution levels, not shown, situated behind the partition 12, must be maintained above the lower edge 13a of each of the baffles for the individual chambers. This is accomplished by regulating the feed temperatures on the evaporator and condenser sides so that the vapor temperature in the lowermost and uppermost stages is equal to the saturated vapor pressure which, in turn, is in equilibrium with the liquid pressure. When equilibrium between the vapor and liquid pressures in the lowermost and uppermost stages has been achieved, then the liquid levels in the other stages are also correct.

Figure 4:
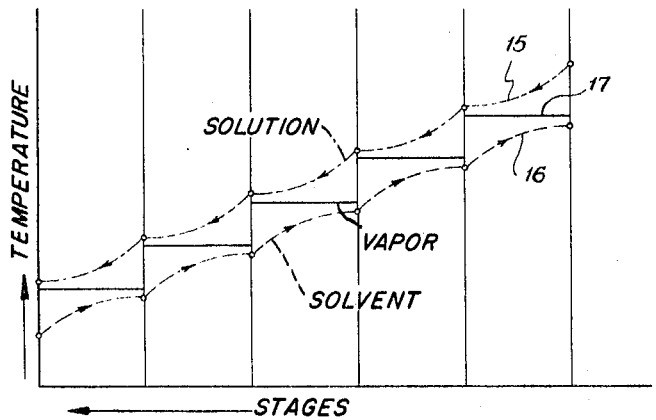
FIGURE 4 is a chart showing the temperature variations in the various stages of FIGURE 1.
Figure 5:
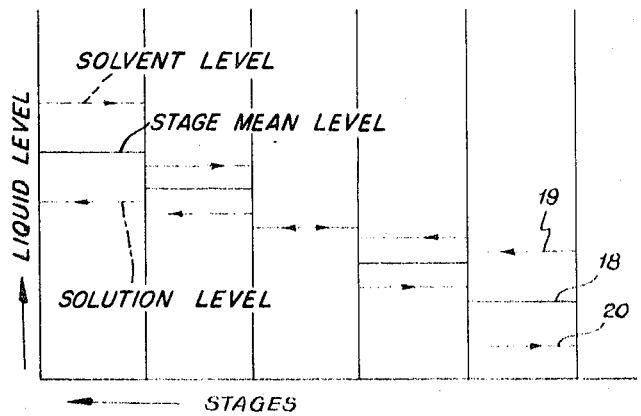
FIGURE 5 is a chart showing the corresponding vapor pressures of FIGURE 4.

In the chart of FIGURE 4, the temperature variation of the solution 15 and the condensate 16 is shown in the individual stages as well as the vapor temperatures 17. The relevant saturated vapor pressures for these vapor temperatures equal the fluid levels 18, which are to be understood as mean stage levels of the solution level 19 and the condensate level 20, as shown in FIGURE 5.

Furthermore, the amount of condensate drawn off from the cold condensate discharge pipe 10 should be sufficient only to ensure that the liquid level in the stage chambers is maintained at a height well above the lower edges 13a of the baffles 13.

To obtain the circulation of the solution and the condensate, the flow pressure losses of the evaporator and condenser must be overcome. This causes the solution levels in the lower stages to rise above and in the upper stages to sink below the mean levels. On the other hand, the condensate levels in the upper stages drop and in the lower stages rise. In FIGURE 5 are shown the solution levels 19 and the condensate levels 20 on the condenser side in all five stages. FIGURE 3 shows the liquid levels in the lowermost stage.

Figure 6:
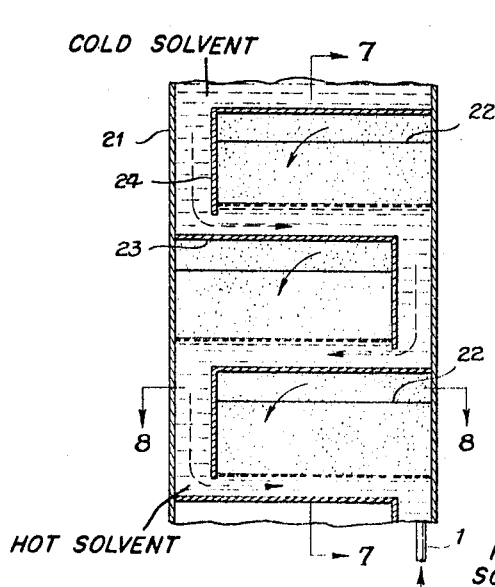
FIGURE 6 is a cross-sectional view through a modified form of an apparatus for the method of this invention.
Figure 7:
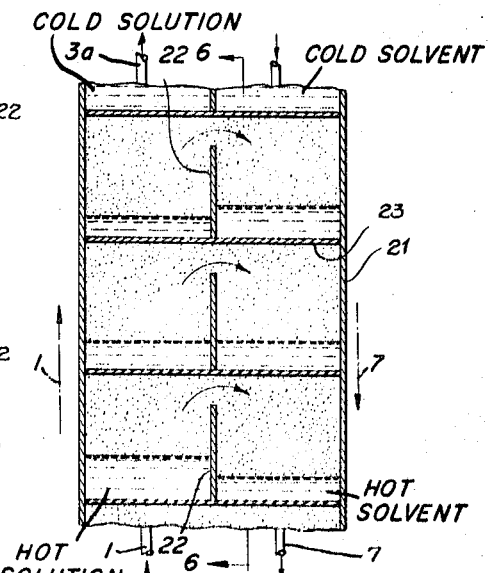
FIGURE 7 is a cross-sectional view taken on the line 7—7 of FIGURE 6.
Figure 8:
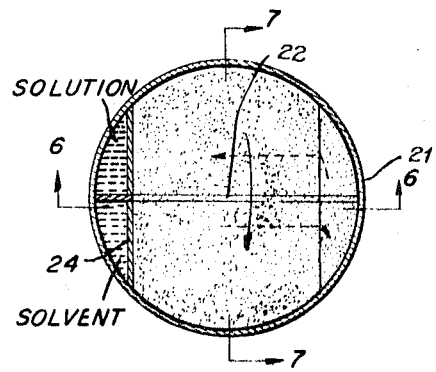
FIGURE 8 is a cross-sectional view taken on the line 8—8 of FIGURE 6.

In the modified form of the invention shown in FIGURES 6 to 8, the evaporator is composed of a tank 21, a partition 22 passing longitudinally through the entire tank, horizontally extending baffle plates 23, and shaft walls 24.

As in the evaporator shown in FIGURE 1, the solution supplied by pipe 1 also flows from the bottom to the top of the evaporator and the condensate flows downwardly through tank 21 to be removed through pipe 7. Plates 23 and walls 24, in effect, form a downwardly directed bell, the lower edge of which is submerged in the evaporating or condensating liquid.

According to the process of this invention, vapor having the same pressure as the liquid is trapped within the bell. If the vapor spaces in two adjacent bells of the same corresponding stage are connected by an opening through the partition 22, the vapors can flow from the solution to the condensate surface in accordance with the heretofore described operating conditions. The temperature and pressure conditions set forth with regard to FIGURE 1 apply likewise to FIGURES 6 to 8.

An example of the method employed in the apparatus of FIGURES 5, 6 and 7 having ten baffle plates 23 vertically separated from each other in the first stage by about 150 mm. is as follows:

5000 kg./h. of an aqueous solution having a salt content of 10% is introduced through pipe 1 into the lowest flash chamber in the first lowermost stage at a temperature of 80° C. and an absolute pressure of approximately 0.5 kg./cm.$^2$ so that, at first, the boiling point is not reached. The liquid flowing into the flash chamber meets the vapor pressure corresponding to a saturated vapor pressure at 77° C. This condition causes the liquid to vaporize partially and to cool it to 79° C. on its way along the corresponding baffle plate 23. At the same time, because of the condensation of the vapor flowing through the opening in the partition wall, 5000 kg./h. of the flow of condensation in the adjacent condensation chamber is heated from 74° C. to 75° C.

In the second stage, whose baffle plate 23 lies 174 mm. above the baffle plate 23 of the first stage, a vapor pressure corresponding to saturated vapor pressure at 76° C. is prevailing. Therefore, the liquid column between the shaft wall 24 and the tank 21 according to the vapor table is exactly sufficient to prevent that the pressures of both stages equalize.

However, during the upwardly moving flow of the aqueous solution, the entire difference of vapor pressure of both stages cannot be used for surmounting the static height of the liquid level, since from about 2 to 4 mm. of the liquid column has to be expended per stage for the loss in flow. Thus, as already mentioned in the basic explanations for FIGURE 5, the difference of the solution levels 19 of two successive stages is less than the difference between the saturated vapor pressures 18 expressed in meters of liquid column. If, therefore, the level of the liquid layer on the baffle plate 23 of the first stage amounts to 40 mm., then it amounts to only 38 mm. in the second stage.

In the second flash chamber, just as it happens in the first one, a further partial vaporization of the aqueous solution takes place, as well as a cooling by 1° C. from 79° C. to 78° C. In the same manner, the stream of condensate in the adjacent condensation chamber is heated by one degree C. from 73° C. to 74° C., again after intake of the prevailing vapor.

With regard to the downwardly directed flow of the condensate, it is necessary, with the aid of the static height of potential energy, to overcome the loss in flow in the same order of magnitude as above in addition to the difference in vapor pressure. The difference of the liquid column 20 between two sucessive condensation chambers according to FIGURE 5 is, therefore, larger than the liquid columns 18 corresponding to the saturated vapor pressure. Thus, if the level of the liquid layer on the baffle plate 23 in the first stage amounts to 10 mm., then it amoutns to 14 mm. in the second stage.

A saturated vapor pressure at 75° C. prevails in the third stage and the distance between the baffle plates between the second and the third stage according to the vapor table is 167 mm. After passing ten stages, the temperature of the aqueous solution is 70° C., the salt content is 10.2% and the amount of the discharge material is about 4900 kg./h. The amount of the difference of 100 kg./h. has been absorbed by the stream of condensate in the form of condensed vapor and this condensate stream enters with about 4900 kg./h. and at a temperature of 65° C. into the condensation chamber of the tenth and uppermost stage in order to leave the apparatus in the lowermost stage, as already mentioned, at 5000 kg./h.

In the two forms of the invention described, each stage consists only of a pair of partitions, and therefore, as a result of the low manufacturing cost per stage, a considerably greater number of stages can be provided than in heretofore used evaporators at the same cost. As a result, the amount of heat necessary to feed heat exchanger 9 of FIGURE 1 drops considerably. At the same time, no energy is necessary to deliver the solution and the condensate against the pressure of the respective stages.

Having now described the means by which the objects of the invention are obtained, I claim:

1. Method for multiple effect flash evaporation of a solution and counterflow direct contact condensation of the solvent vapor in condensate in order to concentrate the solution and to gain the solvent, in which the solution successively passes through sevreal stages arranged in a tank above one another and provided with juxtaposed evaporation and condensation chambers, said solution ascending in the evaporation stages beginning with the first and lowermost stage, and said solvent descending in said condensation chambers in reverse order, comprising heating the solution to a temperature very little below its boiling point, introducing the heated solution into the first stage evaporation chamber and partially flash evaporating it therein, introducing the vaporized portion of said solution into the first stage condensation chamber which is vapor-connected only to the first stage evaporation chamber and located on the same level in the tank, condensing this vaporized portion in said first stage condensation chamber through direct contact with the condensate proceeding from higher located stages, introducing the portion of the solution, that has not been vaporized in the first stage, into the second stage evaporation chamber lying on a higher level at a lower pressure, introducing the vapor which is created thereby into the second stage condensation chamber which is vapor-connected only to the second stage evaporation chamber and located on the same level in the tank but which is liquid connected to the first stage condensation chamber and the condensate therein, and so on in further stages, the improvement in which the different stages are connected by two continuous and uninterrupted separatel iquid columns, one each on the evaporation and the condensation sides, whereby the different vapor pressures in the stages starting with the uppermost and coldest stage down to the lowermost and hottest stage are balanced solely by the static pressures of the respective liquids which pressures increase on the way from top to bottom, and the small dynamic losses arising from flow frictions and deflections during the transition from one stage to the next are compensated for solely and uniquely by the differences of the liquid depths which decrease stage by stage in the contrary flow directions of the solution and of the solvent streams.

References Cited

UNITED STATES PATENTS

| | | | |
|---|---|---|---|
| 643,794 | 2/1900 | Harvey | 159—18 |
| 1,145,728 | 6/1915 | Wiegand | 159—18 |
| 2,413,292 | 12/1946 | Christensen | 23—201 |
| 2,749,094 | 6/1956 | Lewis et al. | 165—1 |
| 3,219,554 | 11/1965 | Woodward | 202—173 |
| 3,249,517 | 5/1966 | Lockman | 202—159 |
| 3,288,686 | 11/1966 | Othmer | 203—11 |

NORMAN YUDKOFF, Primary Examiner

J. SOFER, Assistant Examiner

U.S. Cl. X.R.

159—2; 202—173, 185; 203—88